United States Patent
Koo

(10) Patent No.: US 9,489,883 B2
(45) Date of Patent: Nov. 8, 2016

(54) ELECTRONIC APPARATUS AND METHOD OF DISPLAYING IMAGE THEREOF

(71) Applicant: Samsung Electronics Co., Ltd, Suwon-si, Gyeonggi-do (JP)

(72) Inventor: Ja-goun Koo, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 142 days.

(21) Appl. No.: 14/205,719

(22) Filed: Mar. 12, 2014

(65) Prior Publication Data
US 2015/0054838 A1    Feb. 26, 2015

(30) Foreign Application Priority Data

Aug. 21, 2013 (KR) .................. 10-2013-0099211

(51) Int. Cl.
*G09G 3/20* (2006.01)
*G09G 5/14* (2006.01)
*H04N 5/45* (2011.01)
*H04N 5/44* (2011.01)
*H04N 21/431* (2011.01)

(52) U.S. Cl.
CPC ............. *G09G 3/2096* (2013.01); *G09G 5/14* (2013.01); *H04N 5/4401* (2013.01); *H04N 5/45* (2013.01); *G09G 2340/0407* (2013.01); *G09G 2340/14* (2013.01); *G09G 2370/20* (2013.01); *H04N 21/4316* (2013.01)

(58) Field of Classification Search
CPC ............. G09G 5/14; G09G 2340/10; G09G 2340/125; G06T 11/60; H04N 5/44504
See application file for complete search history.

(56) References Cited

U.S. PATENT DOCUMENTS

| 5,724,063 A | 3/1998 | Chee et al. | |
|---|---|---|---|
| 6,806,911 B2 | 10/2004 | Takemoto | |
| 8,223,171 B2* | 7/2012 | Namie | H04N 5/44504 345/544 |
| 8,538,741 B2 | 9/2013 | Jiang et al. | |
| 2006/0033755 A1* | 2/2006 | Laufer | B60R 1/00 345/629 |
| 2006/0038810 A1* | 2/2006 | Ebata | H04N 5/073 345/213 |
| 2008/0106645 A1* | 5/2008 | Lee | H04N 5/44504 348/565 |
| 2008/0151115 A1* | 6/2008 | Agung | H04N 5/265 348/510 |
| 2009/0135916 A1* | 5/2009 | Lee | H04N 5/44504 375/240.25 |
| 2012/0162281 A1* | 6/2012 | Cho | G09F 13/04 345/690 |
| 2013/0069938 A1* | 3/2013 | Kim | H04N 13/0404 345/419 |
| 2013/0088512 A1* | 4/2013 | Suzuki | G06Q 10/06 345/629 |
| 2013/0135346 A1* | 5/2013 | Sakuramata | G09G 5/377 345/629 |
| 2015/0161799 A1* | 6/2015 | Algreatly | G06T 7/20 345/633 |

FOREIGN PATENT DOCUMENTS

| KR | 1997-0022945 | 5/1997 |
|---|---|---|
| KR | 1999-022041 | 3/1999 |
| KR | 2005-0020888 | 3/2005 |
| KR | 2012-0097863 | 9/2012 |
| KR | 2012-0099776 | 9/2012 |

OTHER PUBLICATIONS

WinSplit (SW) by Winsplit-Revolution; (http://winsplit-revolution.com).
EA93 by LGE-21:9 29 inch EA93.

* cited by examiner

*Primary Examiner* — Todd Buttram
(74) *Attorney, Agent, or Firm* — Staas & Halsey LLP

(57) ABSTRACT

An electronic apparatus includes a graphic processor to generate each of a plurality of images as a different signal, an incorporation unit to incorporate the plurality of generated images into one image, and a display to display the incorporated image.

22 Claims, 13 Drawing Sheets

FIG. 4

| Display 1 | Display 2 | Display 3 | Max. Res Display 1 | Max. Res Display 2 | Max. Res Display 3 |
|---|---|---|---|---|---|
| HDMI | HDMI | DP | 4096x2304@24Hz | 4096x2304@24Hz | 3840x2160@60Hz |
| DVI | DVI | DP | 1920x1200@60Hz | 1920x1200@60Hz | 3840x2160@60Hz |
| DP | DP | DP | 3840x2160@60Hz | 3840x2160@60Hz | 3840x2160@60Hz |
| VGA | DP | HDMI | 1920x1200@60Hz | 3840x2160@60Hz | 4096x2304@24Hz |
| eDP | DP | DP | 3200x2000@60Hz | 3840x2160@60Hz | 3840x2160@60Hz |
| eDP | HDMI | HDMI | 3200x2000@60Hz | 4096x2304@24Hz | 4096x2304@24Hz |

Display Control Panel

Display Mode Changes

ELECTRONIC APPARATUS AND METHOD OF DISPLAYING IMAGE THEREOF

CROSS-REFERENCE TO RELATED APPLICATIONS

This application claims priority under 35 U.S.C. §119 (a) from Korean Patent Application No. 10-2013-0099211, filed in the Korean Intellectual Property Office on Aug. 21, 2013, the disclosure of which is incorporated herein by reference in its entirety.

BACKGROUND

1. Field

The present general inventive concept generally relates to an electronic apparatus and a method of displaying an image thereof, and more particularly to, an electronic apparatus capable of merging and displaying a plurality of generated areas into one area and a method of displaying an image thereof.

2. Description of the Related Art

Recently, mobile electronic devices, such as notebook PC, convertible notebook PC, tablet, and smart phone, are becoming thinner and lighter in order to improve mobility in terms of Form Factor (F/F), and their performance is also improved with the development of semiconductor technology and process architecture.

The size and form of data that can be processed by such electronic apparatuses have become diverse, and the type of usage and experience of a user who uses such apparatuses have also become diverse. In addition, with the development of Information and Telecommunication (IT) technology, the resolution and technology of flat panel, such as Liquid Crystal Display (LCD), have been improved remarkably and thus, there is a growing demand for dividing a display area of the electronic apparatuses.

Conventionally, one screen is divided into a plurality of areas using a software method. However, it is difficult to divide a screen using a software method when a program only operates in a full screen mode, such as a game. In addition, it is also not easy to adjust the size of each window, and to display a user interface window regarding a macro application and a user interface window regarding a desktop application individually on Window 8 (trademark).

SUMMARY

The present general inventive concept provides an electronic apparatus capable of generating a plurality of images and incorporating and displaying the plurality of generated images into one image, and a method of displaying an image thereof.

Additional features and utilities of the present general inventive concept will be set forth in part in the description which follows and, in part, will be obvious from the description, or may be learned by practice of the general inventive concept.

The forgoing and/or other features and utilities of the present general inventive concept are achieved by providing an electronic apparatus including a graphic processor to generate each of a plurality of images as a different signal, an incorporation unit to incorporate the plurality of generated images into one image, and a display to display the incorporated image.

The graphic processor may generate a number of the images corresponding to a number of images incorporated by the incorporation unit.

The graphic processor may be at least one of integrated Graphics Processing Unit (iGPU) and discrete Graphics Processing Unit (dGPU).

The graphic processor may output an image as a signal according to at least one method from among high definition multimedia interface (HDMI), digital video/visual interactive (DVI), Display Port (DP), Low voltage Differential Signaling (LVDS), Video Graphics Array (VGA), and Embedded Display Port (eDP).

The graphic processor may generate an image corresponding to a resolution displayed on the display with respect to each of the plurality of images.

The graphic processor may generate a first image and a second image which are different from each other, and the incorporation unit may incorporate the first image and the second image.

The incorporation unit may incorporate the first image and the second image such that the second image is disposed at a predetermined location in the first image.

The graphic processor may further generate a third image, and the electronic apparatus may further include a communication interface to transmit the generated third image to an external display.

The incorporation unit may incorporate the plurality of image signals in a horizontal direction.

Sizes of the plurality of images in the incorporated image may be different from each other.

The incorporation unit may incorporate the image signals in different methods into one image signal.

The incorporation unit may perform image quality improvement processing with respect to the incorporated image, and output the processed image.

The apparatus may further include an input unit to receive a control command and a controller to control the graphic processor to generate a plurality of images corresponding to the input control command.

The controller may acknowledge that a number of displays corresponding to a number of images incorporated by the incorporation unit are installed in the electronic apparatus.

When a command to add an image is input through the input unit, the incorporation unit may notify the controller that a new display is connected to the electronic apparatus.

When a command to remove an image from among the plurality of images is input, the incorporation unit may notify the controller that a display corresponding to the removed image is removed from the electronic apparatus.

The incorporation unit may notify the controller that a resolution of a display apparatus corresponding to an image which is not removed is changed The forgoing and/or other features and utilities of the present general inventive concept may also be achieved by providing a method of displaying an image of an electronic apparatus includes generating each of a plurality of images as different image signals, incorporating the plurality of generated images into one image, and displaying the incorporated image on one display.

The generating may include generating an image corresponding to a resolution displayed on the display with respect to each of the plurality of images.

The incorporating may include incorporating the image signals in different methods into one image signal.

The method may further include performing image quality improvement processing with respect to the incorporated image.

The method may further include, when a command to add an image is input, notifying an operating system that a new display is connected to the electronic apparatus.

The method may further include, when a command to remove an image from among the plurality of images is input, notifying an operating system that a display corresponding to the removed image is removed from the electronic apparatus.

The notifying may include notifying the operating system that a resolution of a display apparatus corresponding to an image which is not removed is changed.

The present general inventive concept can also be achieved by providing a non-transitory computer readable recording medium having embodied thereon a computer program to execute an image displaying method according to an exemplary embodiment of the present inventive concept, the image displaying method includes receiving a plurality of images having different signals, incorporating the plurality of received images into one image, and outputting the incorporated image to one display.

The present general inventive concept can also be achieved by providing an electronic apparatus to display images on a display of the electronic apparatus, including a graphic processor to generate a plurality of images each having different resolutions, and an incorporation unit to combine the plurality of images into a single image having a resolution compatible with a resolution of the display.

The plurality of images may be arranged within the single image based on division information defining a layout of the single image.

The division information may include information whether the plurality of images is to be arranged vertically with respect to each other, horizontally with respect to each other, or in a picture-in-picture type arrangement.

The present general inventive concept can also be achieved by providing a method of displaying images of an electronic apparatus on a display, including obtaining division information of a plurality of images, generating one image signal corresponding to the plurality of images according to the obtained division information, incorporating the plurality of images into one image according to the generated one image signal and having a resolution compatible with a resolution of the display, and displaying the incorporated image on the display of the electronic apparatus.

The method of displaying images may include acknowledging a virtual display being connected to the electronic apparatus having the display.

The step of acknowledging may further include acknowledging attachment of a new virtual display or detachment of an existing virtual display in response to a user command.

The step of generating may also include generating a plurality of image signals corresponding to the plurality of images.

The plurality of image signals may be different with respect to each other.

In the method of displaying images, the plurality of images may be incorporated in a horizontal direction, a vertical direction, a Picture in Picture method, or any combination thereof.

In the method of displaying images, the plurality of images may be displayed in a display mode that can be changed by a user command.

The display mode may correspond with a horizontal direction, a vertical direction, a Picture in Picture method, or any combination thereof.

The display mode may be characterized by at least one of factors including a number of divisions of a screen, a direction of the divisions, and a ratio of divided portions of the screen.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a view illustrating an example of an image that may be output from a graphic processor of FIG. 2;

FIG. 10A illustrates a display control panel and FIG. 10B illustrates display mode changes;

DETAILED DESCRIPTION OF THE EXEMPLARY EMBODIMENTS

Figure 1:
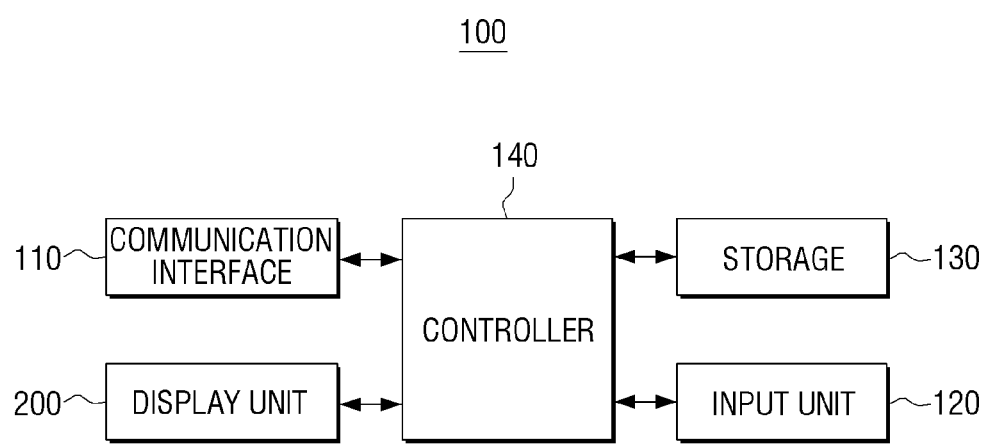
FIG. 1 is a block diagram illustrating an electronic apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating an electronic apparatus according to an exemplary embodiment of the present general inventive concept.

Referring to FIG. 1, an electronic apparatus 100 includes a communication interface 110, a display unit 200, an input unit 120, a storage 130, and a controller 140. Herein, the electronic apparatus 100 may be a notebook personal computer (PC), a tablet PC, a smart phone, a personal media player (PMP), an MP3 player, having a display device, but is not limited thereto.

The communication interface 110 is formed to connect the electronic apparatus 100 to an external apparatus (not illustrated), and may be connected to the external apparatus not only through Local Area Network (LAN) and Internet network but also through a wireless communication method, such as GSM, UMTS, LTE, and WiBRO, but is not limited thereto.

Figure 2:
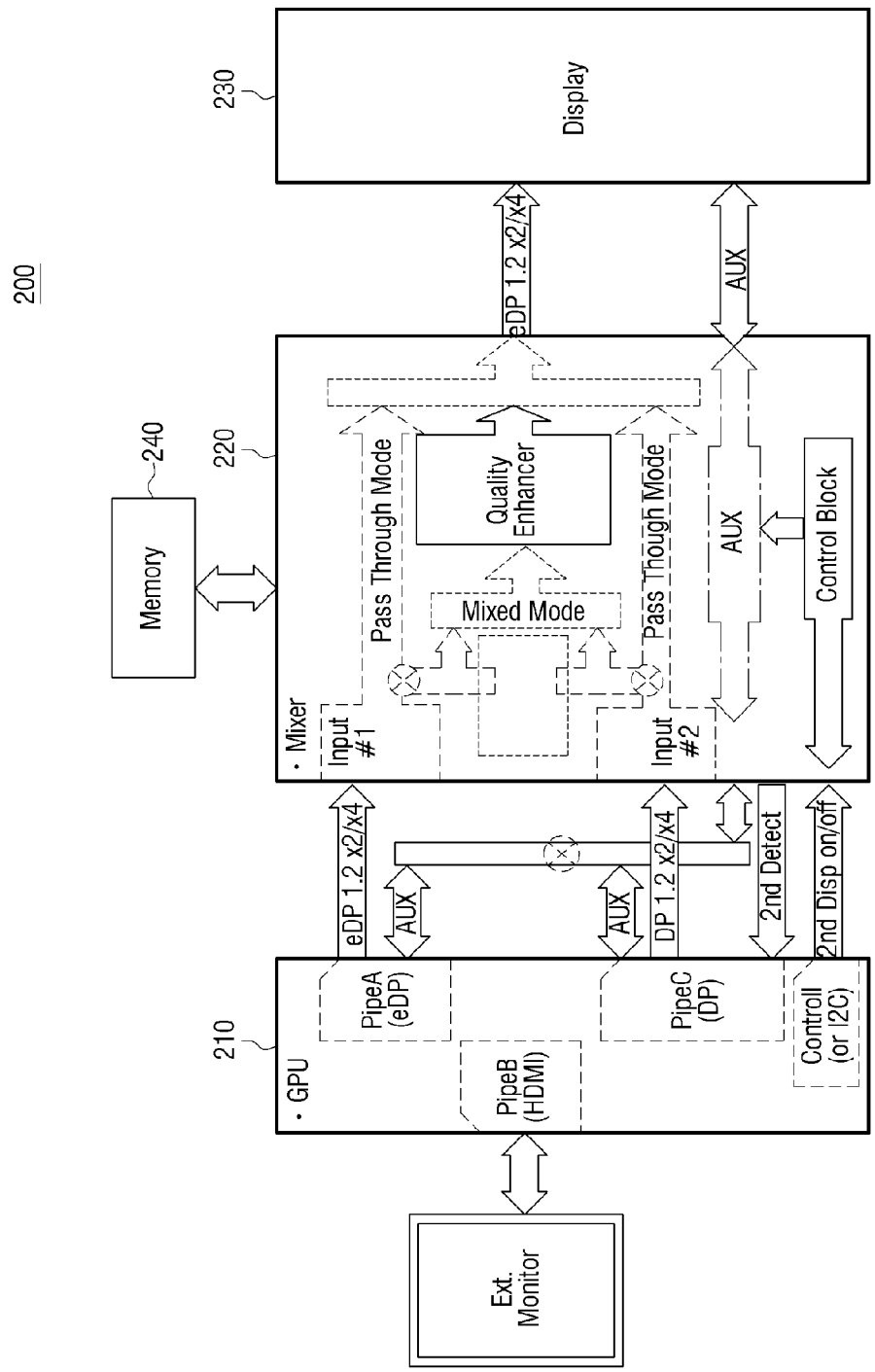
FIG. 2 is a block diagram illustrating a display according to a first exemplary embodiment of the present general inventive concept.

In addition, the communication interface 110 may perform communication with an external apparatus (not illustrated). Specifically, when the communication interface 110 is connected to an external display apparatus, the communication interface 110 may transmit an image generated from a graphic processor 210, as illustrated in FIG. 2, to the external display apparatus. Herein, the communication interface 110 may be connected to the external display apparatus via an interface like a high definition multimedia interface (HDMI), a digital video/visual interactive (DMV), a Display Port (DP), a Low voltage differential signaling (LVDS), a Video Graphics Array (VGA), or an Embedded Display Port (eDP), but is not limited thereto.

The display unit 200 displays an image. Specifically, the display unit 200 generates a plurality of images, incorporates the plurality of images according to a hardware method, and displays the incorporated image on one display. Accordingly, a system of the electronic apparatus 100 acknowledges that a plurality of displays 230, as illustrated in FIG. 3, is connected to the electronic apparatus 100 and performs processing accordingly. The specific configuration and operation of the display unit 200 will be described later with reference to FIG. 2.

Referring to FIG. 1, the input unit 120 includes a plurality of function keys (not illustrated) through which a user may set or select various functions supported by the electronic apparatus 100. Specifically, the input unit 120 may receive from a user a command to display a multi-display, a command to adjust the ratio of each screen while the multi-display is displayed, or a command to display only one screen while the multi-display is displayed. In FIG. 1, the input unit 120 and the display unit 200 are described as two separate elements, but they may also be combined as one element to provide input and output simultaneously, such as a touch screen, but is not limited thereto.

The storage 130 stores a program to operate the electronic apparatus 100. Specifically, the storage 130 may store a program containing a group of various commands that are necessary to operate the electronic apparatus 100. Herein, the program includes not only an application program to provide a specific service but also an operating program to operate an application program.

The storage 130 may be a storage medium inside the electronic apparatus 100, or as an external storage medium, such as a removable disk including a USB memory or a web server via network, but is not limited thereto.

The controller 140 controls each element of the electronic apparatus 100. Specifically, the controller 140 may control the display unit 200 to generate and to display an image according to a user control command input through the input unit 120. Meanwhile, when the display unit 200 displays a plurality of images, the controller 140 acknowledges that a plurality of displays is connected to the electronic apparatus 100. For example, if the display unit 200 displays two images on one display 230, the controller 140 acknowledges that two displays are logically connected to the electronic apparatus 100 and that one image is displayed on one display and the other image is displayed on the other display.

As described above, an electronic apparatus 100 according to an exemplary embodiment of the present general inventive concept acknowledges that a plurality of displays is connected and performs processing accordingly even if only one display 230 is connected, thereby performing processing as if multiple displays are connected to the electronic apparatus 100.

FIG. 2 is a block diagram illustrating a display unit 200 according to a first exemplary embodiment of the present general inventive concept.

Referring to FIG. 2, the display unit 200 includes the graphic processor 210, an incorporation unit 220, a display 230, and a memory 240.

The graphic processor 210 generates each of a plurality of images. Specifically, the graphic processor 210 may generate a plurality of images as different image signals. Herein, the image signals may be HDMI, DVI, DP, LVDS, VGA, and eDP, but are not limited thereto.

In an exemplary embodiment of the present general inventive concept, the graphic processor 210 may generate a first image signal according to an eDP method, a second image according to a DP method, and a third image according to an HDMI method. Herein, the first image and the second image are provided to the incorporation unit 220. The third image is generated when an external display apparatus is connected to the electronic apparatus 100, and in this case, the third image may be transmitted to the external display apparatus through the communication interface 110.

The graphic processor 210 may be integrated Graphics Processing Unit (iGPU) or discrete Graphics Processing Unit (dGPU). Herein, the iGPU is a graphic processing unit included in a package same as CPU or main chipset, and the dGPU is a graphic processing unit that is mounted on a main board as a separate package, or is mounted on a system as a separate module. Meanwhile, in FIG. 2, the graphic processor 210 is described as either iGPU or dGPU, but the graphic processor 210 may also be both iGPU and dGPU, which will be described later in FIG. 8.

In addition, the graphic processor 210 of FIG. 2 may generate a number of images corresponding to a number of images incorporated by the incorporation unit 220. Specifically, when the graphic processor 210 outputs two images and the incorporation unit 220 bypasses only one image, the image bypassed by the incorporation unit 220 is generated unnecessarily. Thus, the graphic processor 210 may generate the number of images corresponding to the number of images incorporated by the incorporation unit 220.

Subsequently, the graphic processor 210 may generate an image corresponding to a resolution displayed on a display with respect to each of a plurality of images. For instance, if a resolution that can be displayed on one display is 1920×1200 and two images are incorporated, the graphic processor 210 may generate two signals having the resolution of 1920×1200, respectively.

In this case, the incorporation unit 220 may convert the resolution of the two images and incorporate them. However, processing the images in this way may lead to distortion of images, which may be prevented by generating two image signals with each having a resolution of 960×1200, respectively, in the graphic processor 210.

In the above exemplary embodiment of the present general inventive concept, it is described that two image signals each having the resolution of 960×1200 are generated, when the two images are displayed in the same ratio. When the two images are displayed in different ratios, for example, 4:6 instead of 3:7, the graphic processor 210 may also generate an image having a resolution compatible with a resolution of the display 230 with respect to each of a plurality of images, respectively.

The incorporation unit 220 incorporates a plurality of generated images into one image. Specifically, the incorporation unit 220 may incorporate a plurality of image signals transmitted from the graphic processor 210 into one image signal and output the one image signal, or may output only one of a plurality of image signals. The incorporation unit 220 may be realized as application specific integrated circuit (ASIC).

Figure 12:
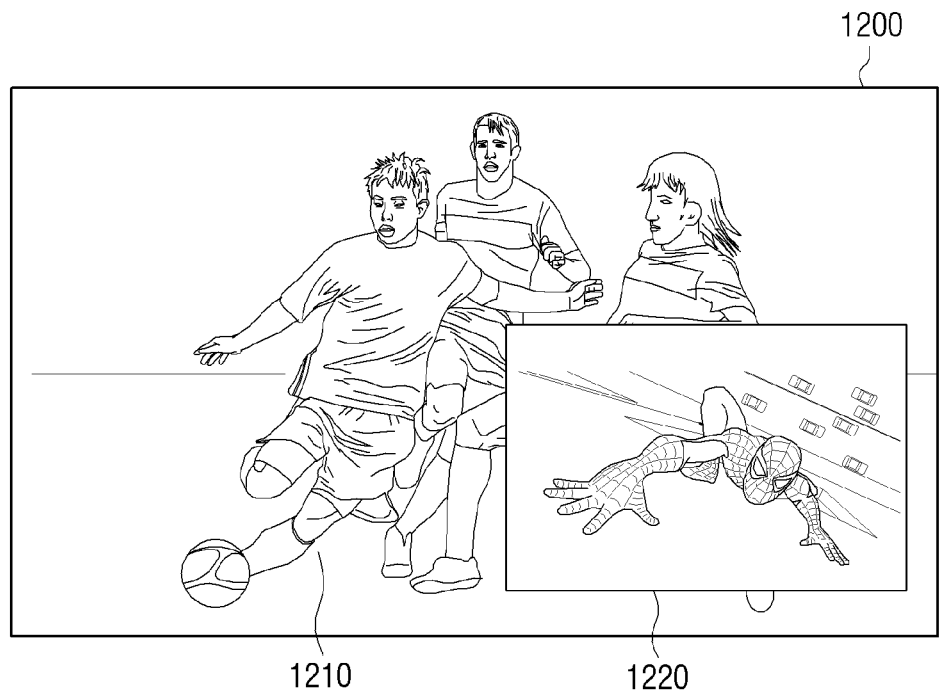
FIG. 12 is a view illustrating an example of an output of a display according to another exemplary embodiment of the present general inventive concept.

The incorporation unit 220 may incorporate a plurality of images in a horizontal direction, in a vertical direction, or according to a Picture in Picture (PIP) method. Specifically, the incorporation unit 220 may incorporate two images by disposing a first image on the left and a second image on the right (that is, in a horizontal direction) or by disposing the first image on the upper side and the second image on the lower side (that is, in a vertical direction), or may incorporate two images according to a PIP method 1200 as illustrated in FIG. 12. Sizes of the two incorporated images may be same or different.

Referring to FIG. 2, when the two images are incorporated, it is described that the two images are incorporated in a horizontal or a vertical direction. However, if four images are incorporated, four images may be incorporated in both horizontal and vertical directions, such as in a form of 2×2. In addition, if three images are incorporated, two of the three images may be incorporated in a horizontal direction or a vertical direction and the other one image may be incorporated in a form of PIP screen.

In addition, the incorporation unit 220 may output an image incorporated in an interface method, which can be recognized by the display 230.

Examples of an image output from the incorporation unit 220 are illustrated in FIG. 3.

Further, the incorporation unit 220 of FIG. 2 may perform a processing to improve image quality of an incorporated image, and output the incorporated image with the improved quality on a display. The improvement of the image quality is not limited to an incorporated image, but each of the plurality of images may also be processed for the image quality improvement before being incorporated.

When a command to add an image is input, the incorporation unit 220 may notify the controller 140 that a new display is connected to the electronic apparatus 100 through a detecting method, including a HotPlug method or a Plug and Play method, but is not limited thereto. In this case, the resolution of the new display corresponds to the image on the display 230, and the incorporation unit 220 may notify the controller 140 that a (virtual) display having a certain resolution is connected. In this process, the resolution of a previously-displayed image is changed, and thus, the incorporation unit 220 may notify the controller 140 that the resolution of the previous display apparatus is changed.

For example, while one image with a resolution of 1920×1200 is displayed, a system acknowledges that an eDP display apparatus with the resolution of 1920×1200 is connected. In this case, when a command to add an image is input from a user, such as to add an image with an equal ratio, the incorporation unit 220 may notify the controller 140 that a DP display apparatus with the resolution of 960×1200 is newly added and the resolution of the eDP display apparatus has been changed from 1920×1200 to 960×1200. Accordingly, the controller 140 may control the graphic processor 210 such that the first image according to the eDP method with the resolution of 960×1200 and the second image according to the DP method with the resolution of 960×1200 may be generated.

A user may also input a command to change an image. Specifically, when the command is to display only a single image while a divisional image is output, the incorporation unit 220 may notify the controller 140 that a virtual display corresponding to an image, which is not to be displayed, is detached from the electronic apparatus 100. In this case, the incorporation unit 220 may notify the controller 140 that the resolution of a display corresponding to an image, which is not removed, is changed.

For example, there are two images including a first image according to the eDP method with a resolution of 960×1200 and a second image according to the DP method with a resolution of 960×1200. When a command to remove the second image is input, the incorporation unit 220 generates and displays an image with a resolution of 1920×1200. The incorporation unit 220 may notify the controller 140 that the display according to the DP method is detached. In addition, the incorporation unit 220 may notify the controller 140 that the resolution of the display according to the eDP method is changed from 960×1200 to 1920×1200. Accordingly, the controller 140 may control the graphic processor 210 to generate an image according to the eDP method with the resolution of 1920×1200.

Meanwhile, when a system is booted initially, every part of the system including the graphic processor 210 and the incorporation unit 220 is initialized, and a display apparatus connected to the system may be detected and initialized. The graphic processor 210 accesses information on each of the virtual display apparatuses that are divided through an AUX signal in each display pipe. In this case, the incorporation unit 220 transmits an output in compliance with a predetermined division ratio to the graphic processor 210 through each pipe.

The display 230 displays an incorporated image. Specifically, the display 230 may receive an incorporated image output from the incorporation unit 220 or a bypassed image and display the input image. The display 230 may be a display element, such as LCD, OLED, PDP, CRT, but is not limited thereto.

Figure 5:
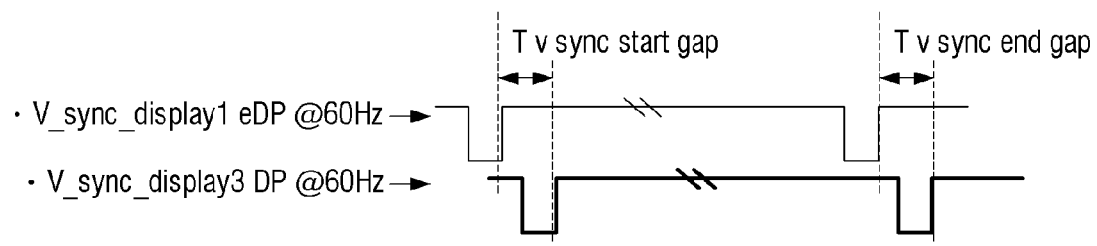
FIG. 5 is a view illustrating an example of an image signal output from the graphic processor of FIG. 2.

The memory 240 of the display unit 200 stores a plurality of images. Specifically, the memory 240 may store a plurality of images output from the graphic processor 210 and output the images to the incorporation unit 220. Specifically, each of a plurality of signals output from the graphic processor 210 may have a different V_Sync Phase as illustrated in FIG. 5. If a gap of V_Sync Phase between two signals of the plurality of signals is increased, an incorporation process conducted by the incorporation unit 220 may be deteriorated. The deterioration may be prevented by removing the V_Sync Phase gap using the memory 240. In FIG. 2, the memory 240 is described as a separate element, but the memory 240 may also be incorporated with the incorporation unit 220, or the graphic processor 210, respectively, to form one element. The memory 240 may be DRAM or SRAM.

Meanwhile, in the above description regarding FIG. 2, when the shape and the ratio of a screen displayed on the display 230 are changed, the incorporation unit 220 recognizes the change first and notifies it to the controller 140.

However, the controller 140 may recognize the change first and then, the change may be notified from the graphic processor 210 to the incorporation unit 220. Alternatively, the graphic processor 210 may recognize the change first and then, the change may be notified to the incorporation unit 220 or the controller 140.

FIGS. 3A through 3E illustrate examples of an output of the display 230 according to the first exemplary embodiment of the present general inventive concept. Here, the display 230 is referred to as displays 310, 320, 330, 340, and 350 in FIGS. 3A through 3E, respectively.

Figure 3A:
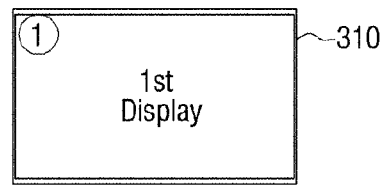
FIGS. 3A through 3E are views illustrating examples of an output of a display according to the first exemplary embodiment of the present general inventive concept.

Referring to FIG. 3A, the display 310 displays only a first image. Accordingly, the incorporation unit 220 may bypass the first image generated from the graphic processor 210 without any separate incorporation processing and transmit the first image to the display 230. The display method of the display 310 may be an initial setting, or a default setting, of the initial booting process of a system. That is, the display of FIG. 3A may be displayed during the initial booting process of a system and then, and it may be changed to one of screens illustrated in FIG. 3B through FIG. 3E upon a user's selection.

Figure 3B:
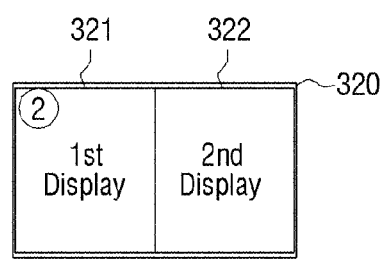

Referring to FIG. 3B, the display 320 is vertically divided and displays a first image 321 and a second image 322. Accordingly, the graphic processor 210 generates a first image and a second image, and the incorporation unit 220 incorporates the two images into one and transmits the incorporated image to the display 230.

Figure 3C:
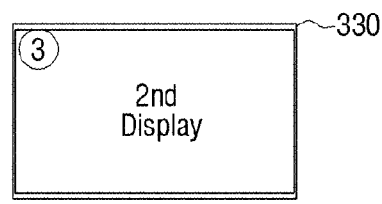

Referring to FIG. 3C, the display 330 displays only the second image. Accordingly, the incorporation unit 220 may bypass the second image generated from the graphic processor 210 without any separate incorporation processing and transmit the second image to the display 230.

Figure 3D:
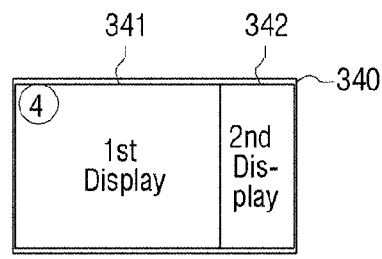
Figure 3E:
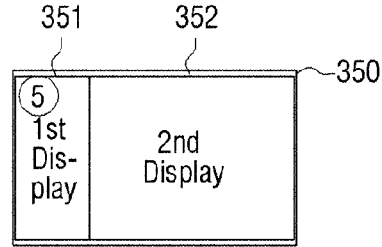

Referring to FIG. 3D, the display 340 is vertically divided to display a first image 341 and a second image 342 generated by the graphic processor 210. Accordingly, the incorporation unit 220 may incorporate the two images into one image with a ratio set by a user and transmit the incorporated image to the display 340. In FIG. 3E, a display 350 is vertically divided in a manner different from the display 340 to display a first image 351 and a second image 352 generated by the graphic processor 210. The incorporation unit 220 incorporates the two images into one image with a ratio set by a user and transmits the incorporated image to the display 350.

FIG. 4 is a view illustrating an example of an image that may be output from the graphic processor 210 of FIG. 2. Specifically, FIG. 4 is a table describing output options that are supported by a commercialized GPU.

Referring to FIG. 5, a commercialized GPU generally supports more than two different outputs.

Figure 6:
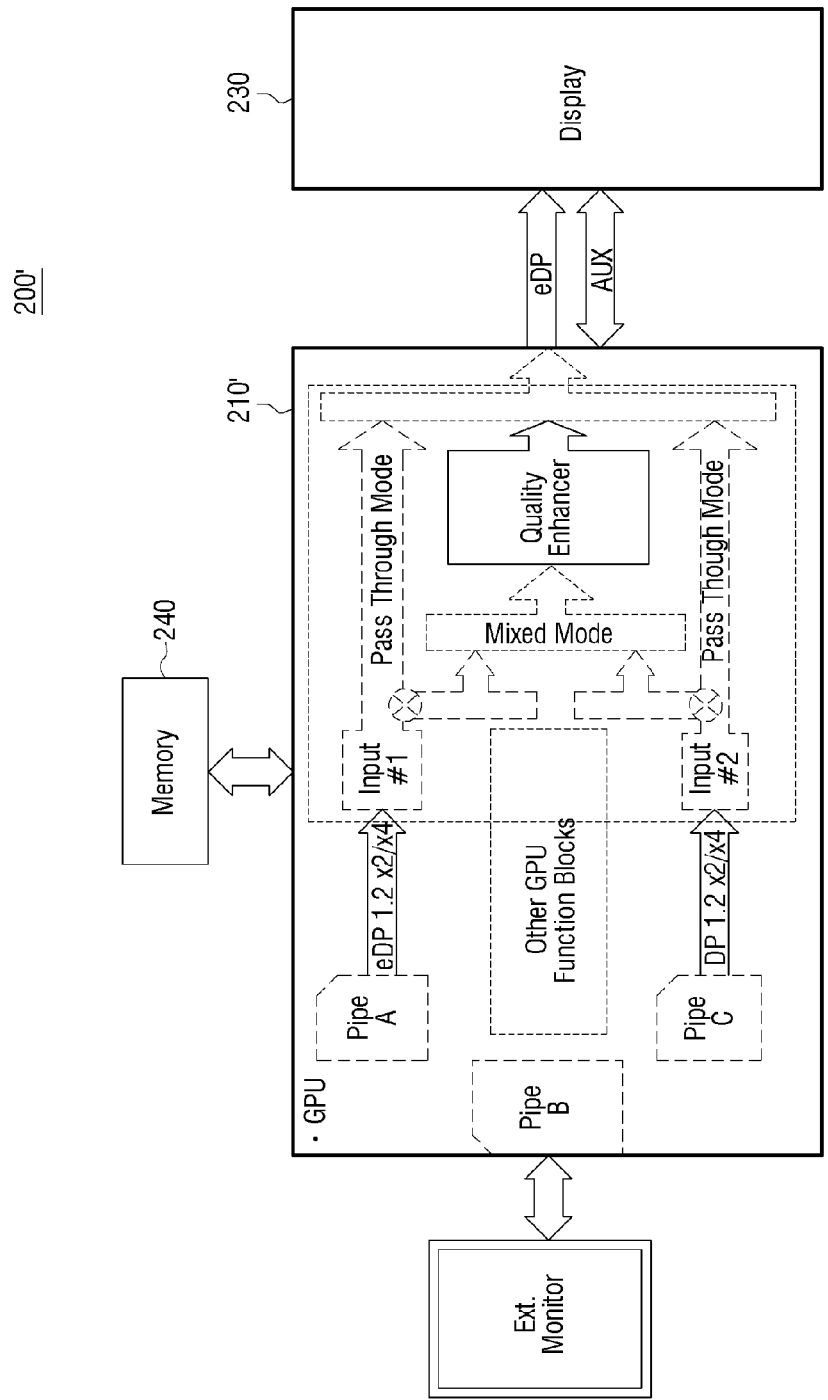
FIG. 6 is a block diagram illustrating a display according to another exemplary embodiment of the present general inventive concept.

FIG. 6 is a block diagram illustrating configuration of a display unit 200' according to a second exemplary embodiment of the present general inventive concept. Specifically, a display 200' is an example, where the graphic processor 210 and the incorporation unit 220 in FIG. 2 are combined to form a graphic processor 210' as one element.

Referring to FIG. 6, the display unit 200' includes the graphic processor 210' and the display 230. The graphic processor 210' performs a combined function of the graphic processor 210 and the incorporation unit 220 of FIG. 2.

Figure 7:
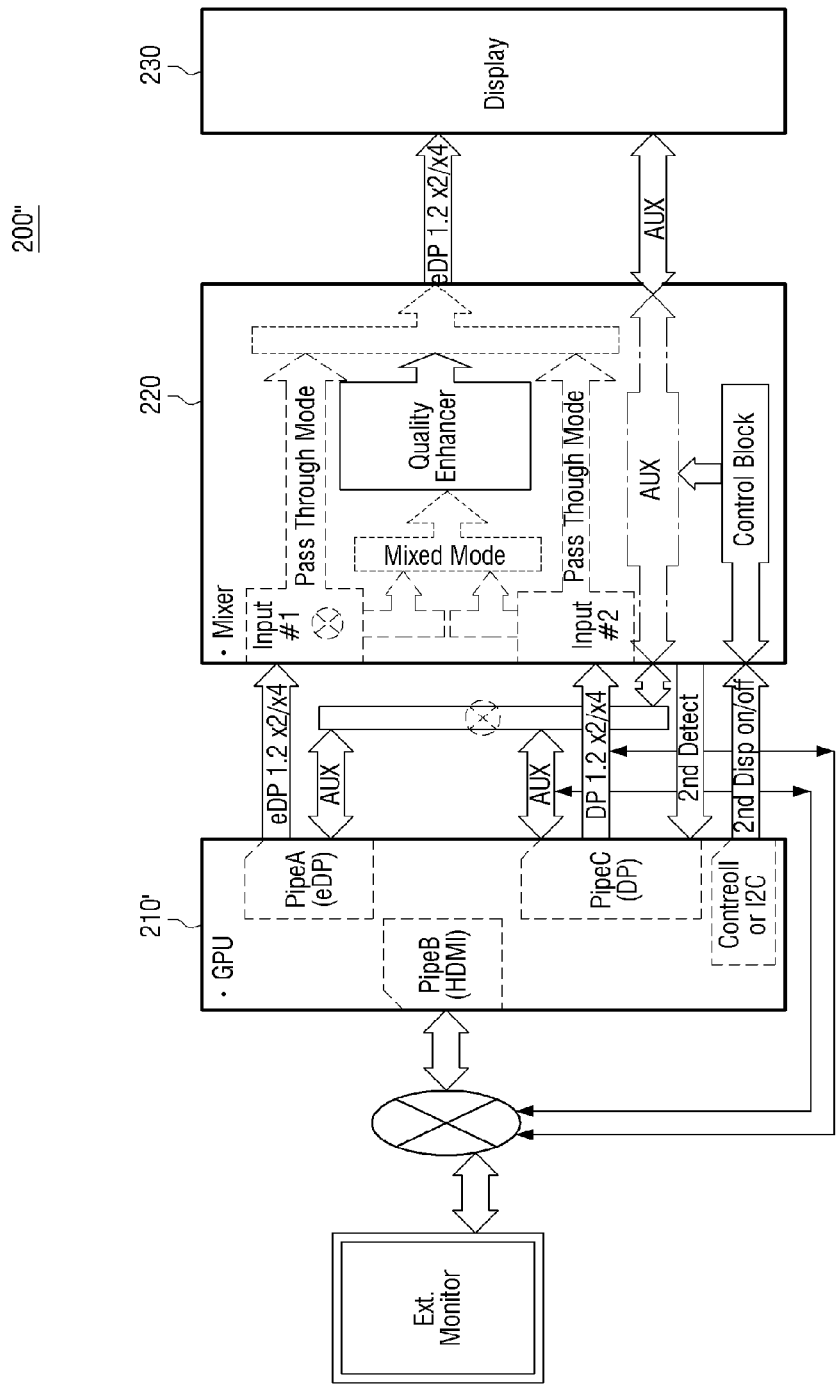
FIG. 7 is a block diagram illustrating a display according to another exemplary embodiment of the present general inventive concept.

FIG. 7 is a block diagram illustrating a display unit 200" according to a third exemplary embodiment of the present inventive concept. Specifically, the display 200" is an example of using an external display apparatus or an external source apparatus.

Referring to FIG. 7, the electronic apparatus 100 may be connected to an external display apparatus or an external image source apparatus. Accordingly, the display unit 200" includes the graphic processor 210", the incorporation unit 220, and the display 230.

Figure 11:
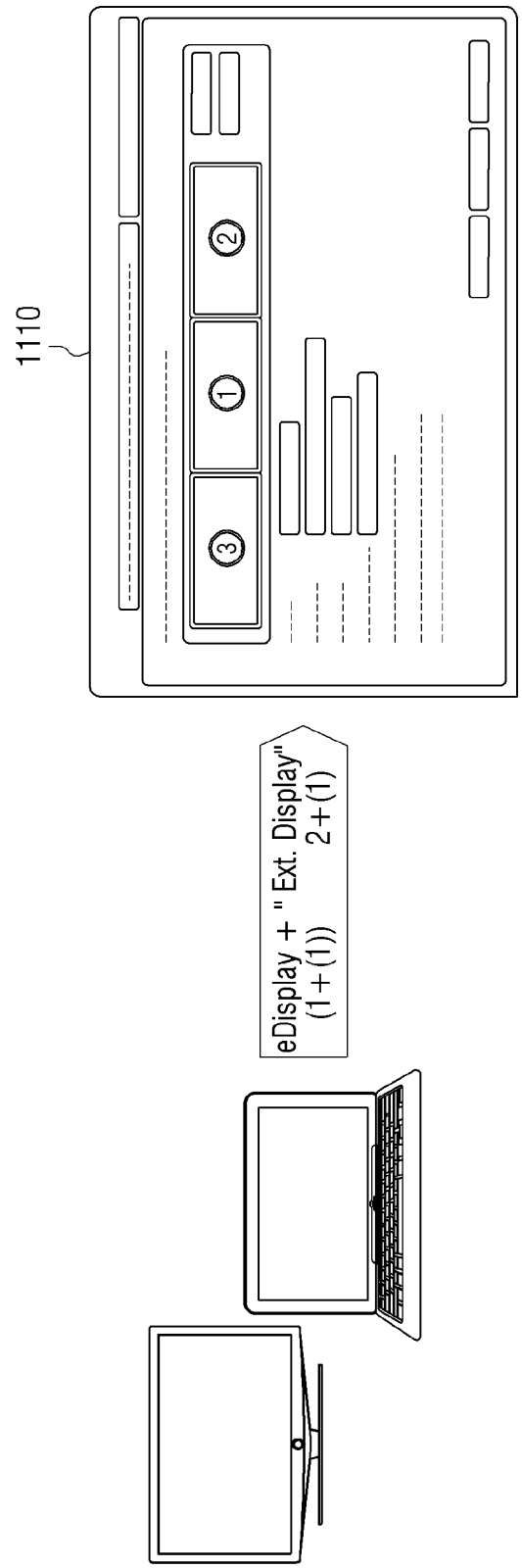
FIG. 11 illustrates an operation of a display when it is connected to an external apparatus.

When an external display apparatus is connected and the graphic processor 210" generates a first image, a second image, and a third image, the generated first and second images may be transmitted to the incorporation unit 220 and the generated third image may be displayed on an external display apparatus through the communication interface 110. In this case, a system may acknowledge that three display apparatuses are connected to the electronic apparatus 100, as illustrated in FIG. 11.

When an external image source apparatus is connected and the graphic processor 210" generates a first image and a second image, the generated first and second images are transmitted to the incorporation unit 220. The incorporation unit 220 may receive the two images from the graphic processor 210" and a third image from the external source apparatus, and may incorporate three images and output the incorporated image to the display 230. The graphic processor 210" may generate only one image to be incorporated with the image from the external source apparatus in the incorporation unit 220.

Figure 8:
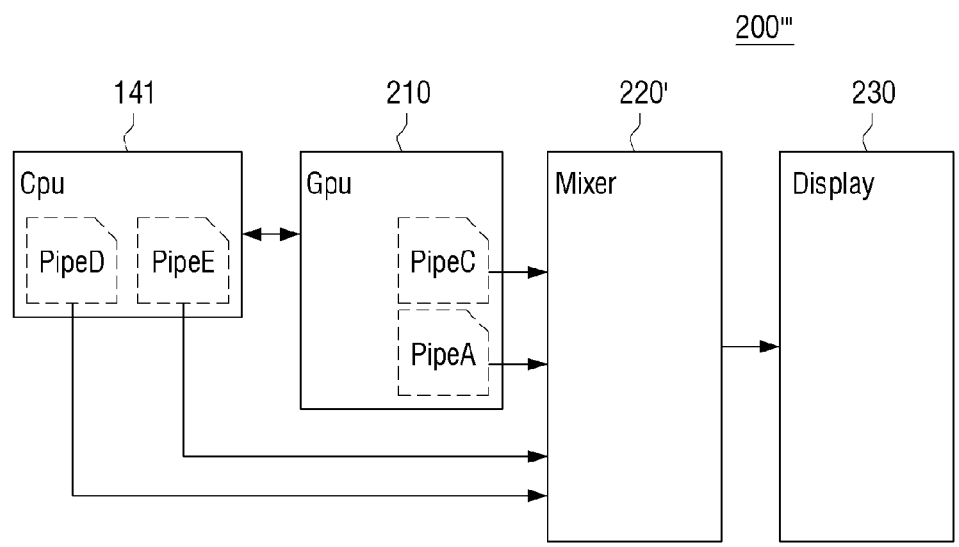
FIG. 8 is a block diagram illustrating a display according to another exemplary embodiment of the present general inventive concept.

FIG. 8 is a block diagram illustrating a display unit 200''' according to a fourth exemplary embodiment of the present inventive concept. Specifically, FIG. 8 is an example of using a plurality of the graphic processors 210.

Referring to FIG. 8, the display unit 200''' includes a CPU 141, the graphic processor 210, an incorporation unit 220' and the display 230.

The CPU 141 is an iGPU. Accordingly, a system including the CPU 141 is capable of generating two images and a system including a dGPU is capable of generating three images.

Figure 9:
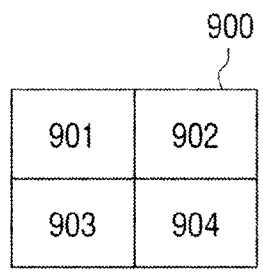
FIG. 9 is a view illustrating an output of a display according to another exemplary embodiment of the present general inventive concept.

The incorporation unit 220' receives two image signals from the CPU 141, and receives two other image signals from the graphic processor 210. That is, the incorporation unit 220' may receive four image signals 901, 902, 903, and 904 simultaneously, and incorporate the four image signals 901-904 into one image signal 900, as illustrated in FIG. 9. Subsequently, the incorporation unit 220' may transmit the incorporated image having the image signal 900 to the display 230.

Figure 10A:
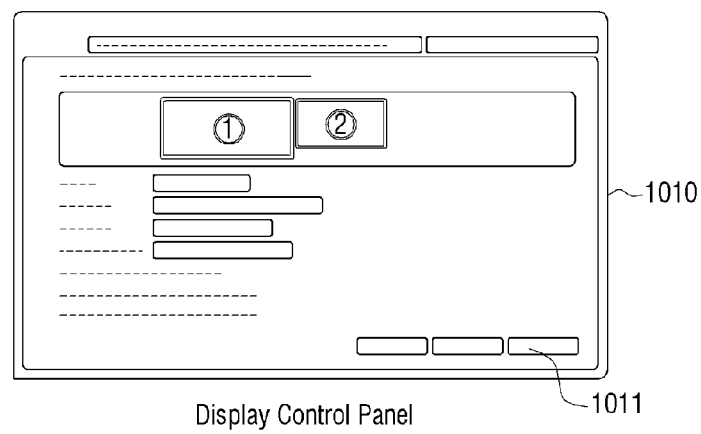
FIGS. 10A and 10B illustrate a process of conversion of an image output from a display, and specifically.
Figure 10B:
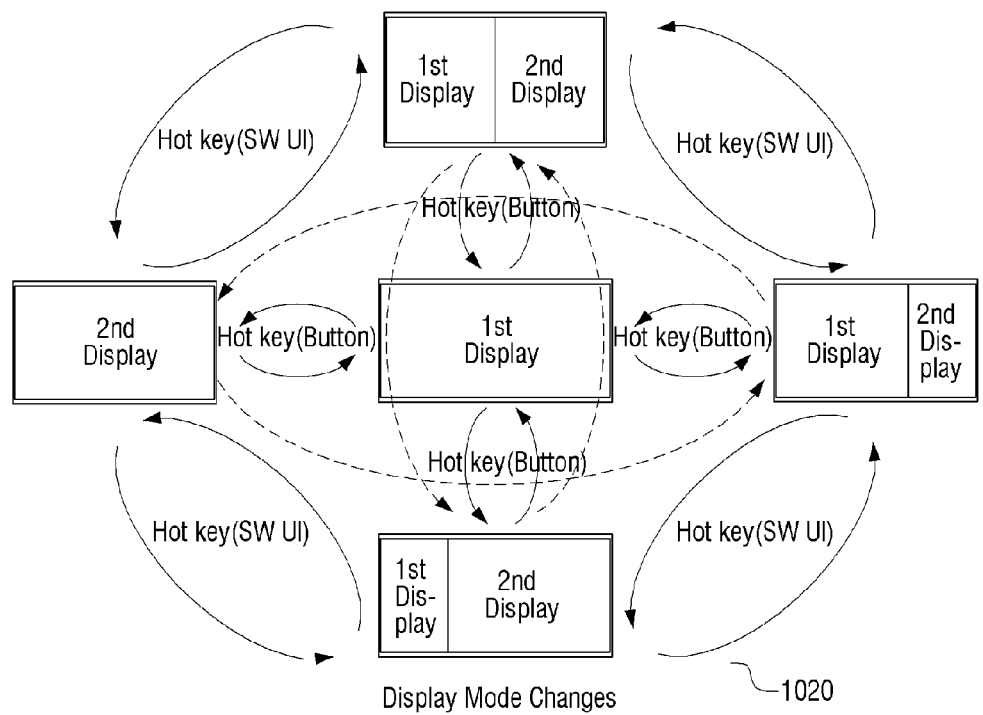

FIG. 10A and FIG. 10B describe a process of conversion of an image output from the display 230. FIG. 10A illustrates a first display control panel 1010, and FIG. 10B illustrates a view of display mode changes 1020.

Referring to FIG. 10A, a system acknowledges that logically two displays are connected although only one display is connected physically.

Accordingly, a user may convert a multi-display mode to a single display mode or convert a single display mode to a multi-display mode through a first display control panel 1010 and a hot key 1011, which could be either a physical button or a software button, or a combination of both, as illustrated in FIG. 10A. In addition, the ratio of a plurality of images may be changed in the multi-display mode. The display modes of FIG. 10B has already been explained above with reference to FIG. 3.

FIG. 11 illustrates a system that may acknowledge three displays being connected to the electronic apparatus 100. Specifically, FIG. 11 illustrates a second display control panel 1110 where three displays including an external display are included thereof.

Referring to FIG. 12, the incorporation unit 220 may incorporate two images 1210 and 1220 according to a PIP method 1200. Specifically, the image 1220, which has a smaller size than the image 1210, is disposed within the image 1210. In FIG. 12, the image 1200 covers a portion of the image 1210, but the image 1200 may also be transparent to a certain degree or in full so that the covered portion of the image 1210 may also be visible.

Figure 13:
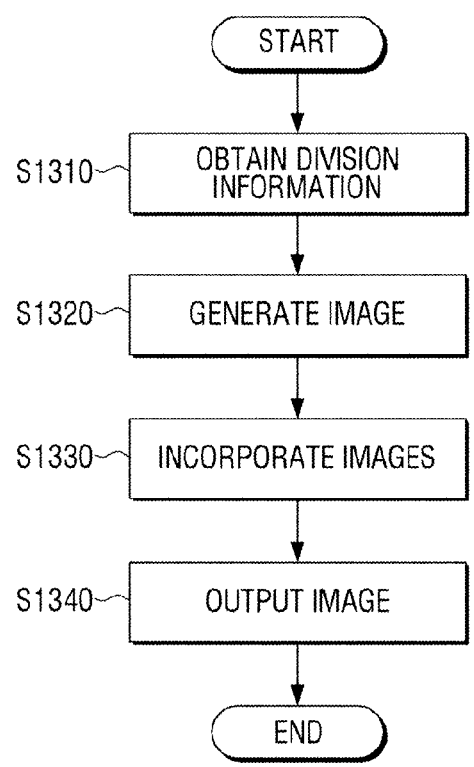
FIG. 13 is a flowchart provided to explain a method of displaying an image according to an exemplary embodiment of the present general inventive concept.

FIG. 13 is a flowchart provided to explain a method of displaying an image according to an exemplary embodiment of the present inventive concept.

Referring to FIG. 13, information regarding a plurality of images to be displayed on the display 230 may be obtained (S1310), including the division information. Specifically, if the plurality of images is required to be displayed simultaneously on the display 230, the resolution of each image may also be obtained. Here, the division information of the plurality of images is obtained first before an incorporated image is generated accordingly, but the division information may also be obtained and used in a process of incorporation.

Each of the plurality of images is generated as different image signals (S1320). Herein, the image signals may be HDMI (high definition multimedia interface), DVI (digital video/visual interactive), DP (Display Port), LVDS (Low voltage differential signaling), VGA (Video Graphics Array), eDP (Embedded Display Port), and are not limited thereto.

The plurality of generated images is incorporated into one image (S1330). Specifically, the plurality of generated image signals may be incorporated into one image signal. In this case, the plurality of images may be incorporated in a horizontal direction, in a vertical direction, or according to a PIP method.

The incorporated images are displayed on a single display 230 (S1340). Specifically, the incorporated images may be output according to an interface method recognizable by the display 230, and the display 230 may receive and display the one image signal generated from the plurality of images according to horizontal division, vertical division, a PIP method, or any combination thereof.

As described above, in a method of displaying an image according to an exemplary embodiment of the present inventive concept, it is acknowledged that a plurality of displays is connected even if one display, the display 230, is connected physically. Thus, processing may be performed as if two or more displays are connected to the electronic apparatus 100. The image displaying method of FIG. 13 may be executed in an electronic apparatus 100 as illustrated in FIG. 1 and FIG. 2, respectively, but is not limited thereto.

Further, the above-described image displaying method may be realized as a program or an application, including algorithm, which is executable in a computer using only operation of the incorporation unit 220 related to FIG. 2, and the program may be stored in a non-transitory computer readable medium and provided therein.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
   a graphic processor to generate each of a plurality of images;
   a mixer to incorporate the plurality of generated images into one image;
   a display to display the incorporated image;
   an inputter to receive a control command; and
   a controller to control the graphic processor to generate a plurality of images corresponding to the input control command,
   wherein when a command to add an image is received, the mixer notifies the controller that a new virtual display apparatus is connected to the electronic apparatus.

2. The apparatus as claimed in claim 1, wherein the graphic processor generates a number of images corresponding to a number of the images incorporated by the mixer.

3. The apparatus as claimed in claim 1, wherein the graphic processor is at least one of integrated Graphics Processing Unit (iGPU) and discrete Graphics Processing Unit (dGPU).

4. The apparatus as claimed in claim 1, wherein the graphic processor outputs an image as a signal according to at least one method from among high definition multimedia interface (HDMI), digital video/visual interactive (DVI), Display Port (DP), Low voltage Differential Signaling (LVDS), Video Graphics Array (VGA), and Embedded Display Port (eDP).

5. The apparatus as claimed in claim 1, wherein the graphic processor generates an image corresponding to a resolution displayed on the display with respect to each of the plurality of images.

6. The apparatus as claimed in claim 1, wherein the graphic processor generates a first image and a second image which are different from each other,
   wherein the mixer incorporates the first image and the second image.

7. The apparatus as claimed in claim 6, wherein the mixer incorporates the first image and the second image such that the second image is disposed at a predetermined location in the first image.

8. The apparatus as claimed in claim 6, wherein the graphic processor further generates a third image,
   wherein the electronic apparatus further comprises a communication interface to transmit the generated third image to an external display.

9. The apparatus as claimed in claim 1, wherein the mixer incorporates the plurality of image signals in a horizontal direction.

10. The apparatus as claimed in claim 9, wherein sizes of the plurality of images in the incorporated image are different from each other.

11. The apparatus as claimed in claim 1, wherein the mixer incorporates the image signals in different methods into one image signal.

12. The apparatus as claimed in claim 1, wherein the mixer performs image quality improvement processing with respect to the incorporated image, and outputs the processed image.

13. The apparatus as claimed in claim 1, wherein the controller acknowledges that a number of virtual displays corresponding to a number of images incorporated by the mixer are installed in the electronic apparatus.

14. The apparatus as claimed in claim 1, wherein when a command to remove an image from among the plurality of images is input, the mixer notifies the controller that a virtual display corresponding to the removed image is removed from the electronic apparatus.

15. The apparatus as claimed in claim 14, wherein the mixer notifies the controller that a resolution of a virtual display apparatus corresponding to an image which is not removed is changed.

16. A method of displaying an image of an electronic apparatus, comprising:
   generating each of a plurality of images;
   incorporating the plurality of generated images into one image;
   displaying the incorporated image on one display; and
   when a command to add an image is input, notifying an operating system that a new virtual display apparatus is connected to the electronic apparatus.

17. The method as claimed in claim 16, wherein the generating comprises generating an image corresponding to a resolution displayed on the display with respect to each of the plurality of images.

18. The method as claimed in claim 16, wherein the incorporating comprises incorporating the image signals in different methods into one image signal.

19. The method as claimed in claim 16, further comprising:
   performing image quality improvement processing with respect to the incorporated image.

20. The method as claimed in claim 16, further comprising:
   when a command to remove an image from among the plurality of images is input, notifying the operating system that a virtual display corresponding to the removed image is removed from the electronic apparatus.

21. The method as claimed in claim 20, wherein the notifying comprises notifying the operating system that a resolution of a virtual display apparatus corresponding to an image which is not removed is changed.

22. A non-transitory computer readable recording medium having embodied thereon a computer program to execute an image displaying method, the image displaying method comprising:
   receiving a plurality of images having different signals;
   incorporating the plurality of received images into one image; and
   outputting the incorporated image to one display;
   when a command to add an image is input, notifying an operating system that a new virtual display apparatus is connected.

* * * * *